United States Patent
Young et al.

(10) Patent No.: US 6,681,185 B1
(45) Date of Patent: Jan. 20, 2004

(54) METHOD OF SEISMIC SIGNAL PROCESSING

(75) Inventors: Roger A. Young, Houston, TX (US); Aleksey B Pankratov, Houston, TX (US); John F. Greve, Sugarland, TX (US)

(73) Assignee: eSeis, Houston, TX (US)

( * ) Notice: Subject to any disclaimer, the term of this patent is extended or adjusted under 35 U.S.C. 154(b) by 0 days.

(21) Appl. No.: 10/206,650

(22) Filed: Jul. 26, 2002

(51) Int. Cl.⁷ .................................................. G01V 1/00
(52) U.S. Cl. .......................................... 702/14; 367/38
(58) Field of Search .............................. 702/14; 367/38

(56) References Cited

U.S. PATENT DOCUMENTS

| | | | | |
|---|---|---|---|---|
| 3,898,610 | A | * | 8/1975 | Pennebaker, Jr. ..... 340/15.5 CP |
| 5,128,866 | A | * | 7/1992 | Weakley ....................... 702/11 |
| 5,311,484 | A | * | 5/1994 | Anderson et al. ............. 367/38 |
| 5,343,440 | A | * | 8/1994 | Kan et al. ...................... 367/27 |
| 5,615,115 | A | * | 3/1997 | Shilling .......................... 702/9 |
| 5,937,362 | A | * | 8/1999 | Lindsay et al. ................. 702/9 |
| 6,374,186 | B1 | * | 4/2002 | Dvorkin et al. ............... 702/18 |

OTHER PUBLICATIONS

"GeoPressure Estimation Software", Petrospec Computer Corporation, Copyright 1990–1999.*
"GeoPressure Estimation Software", Petrospec Computer Corporation, Copyright 1990–1999.*
"Complex Seismic Trace analysis", Taner et al., Geophysics, vol. 44, No. 6, Jun. 1979, pp. 1041–1063.*
"Acoustic Measurements in Unconsolidated Sands at Low Effective Pressure and Overpressure detection", Prasad, Geophysics, vol. 67, No. 2, Mar.–Apr. 2002, pp. 405–412.*

* cited by examiner

Primary Examiner—John Barlow
Assistant Examiner—Toan M Le
(74) Attorney, Agent, or Firm—Kenneth L. Nash

(57) ABSTRACT

A method of seismic analysis is disclosed for determining geopressures or seismic velocities or other formation attributes. A frequency related attribute is determined from seismic data by analysis of the frequency content of one or more signal traces. Geopressure or velocity may then be derived from the frequency related attribute without reliance on moveout techniques. A derivative of a maximum value of pore pressure is utilized to determine a transition zone whereby the derivative peaks and then recedes. The lithology is then examined to determine a formation directly below the transition zone at which an overpressure may exist.

12 Claims, 7 Drawing Sheets

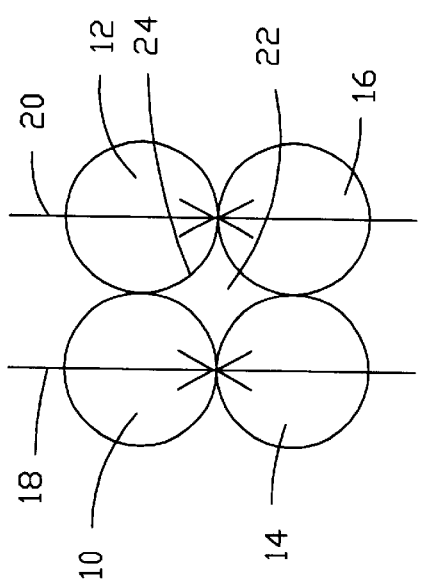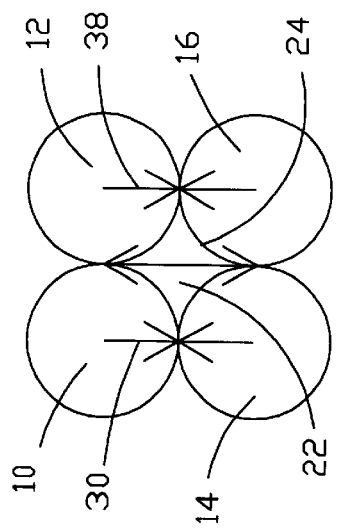
FIG 1A
FIG 1B

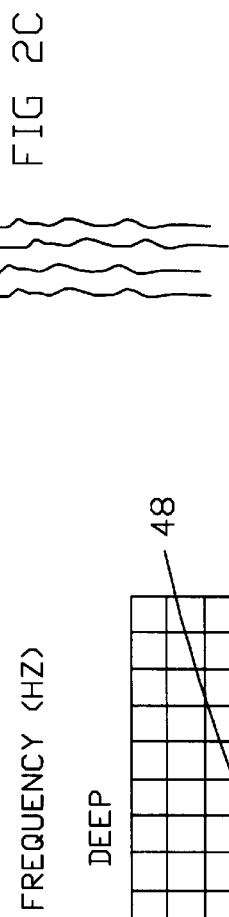
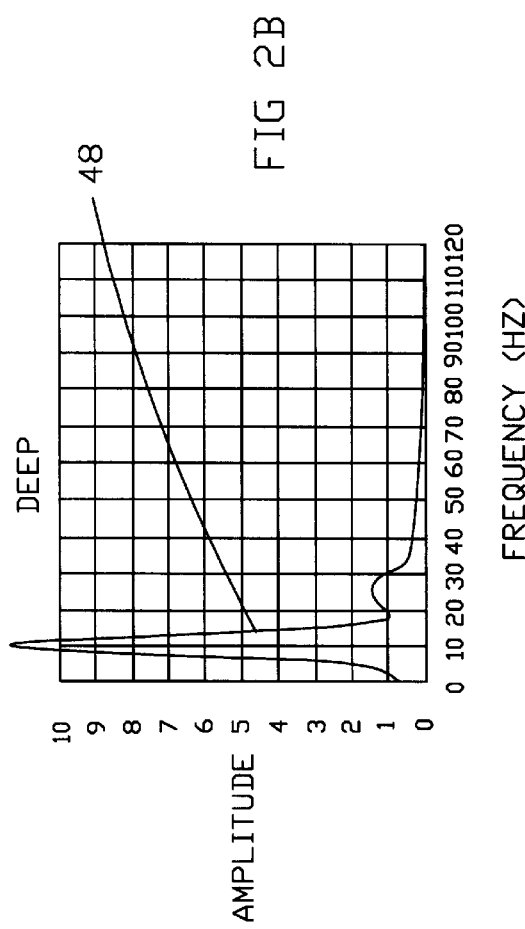

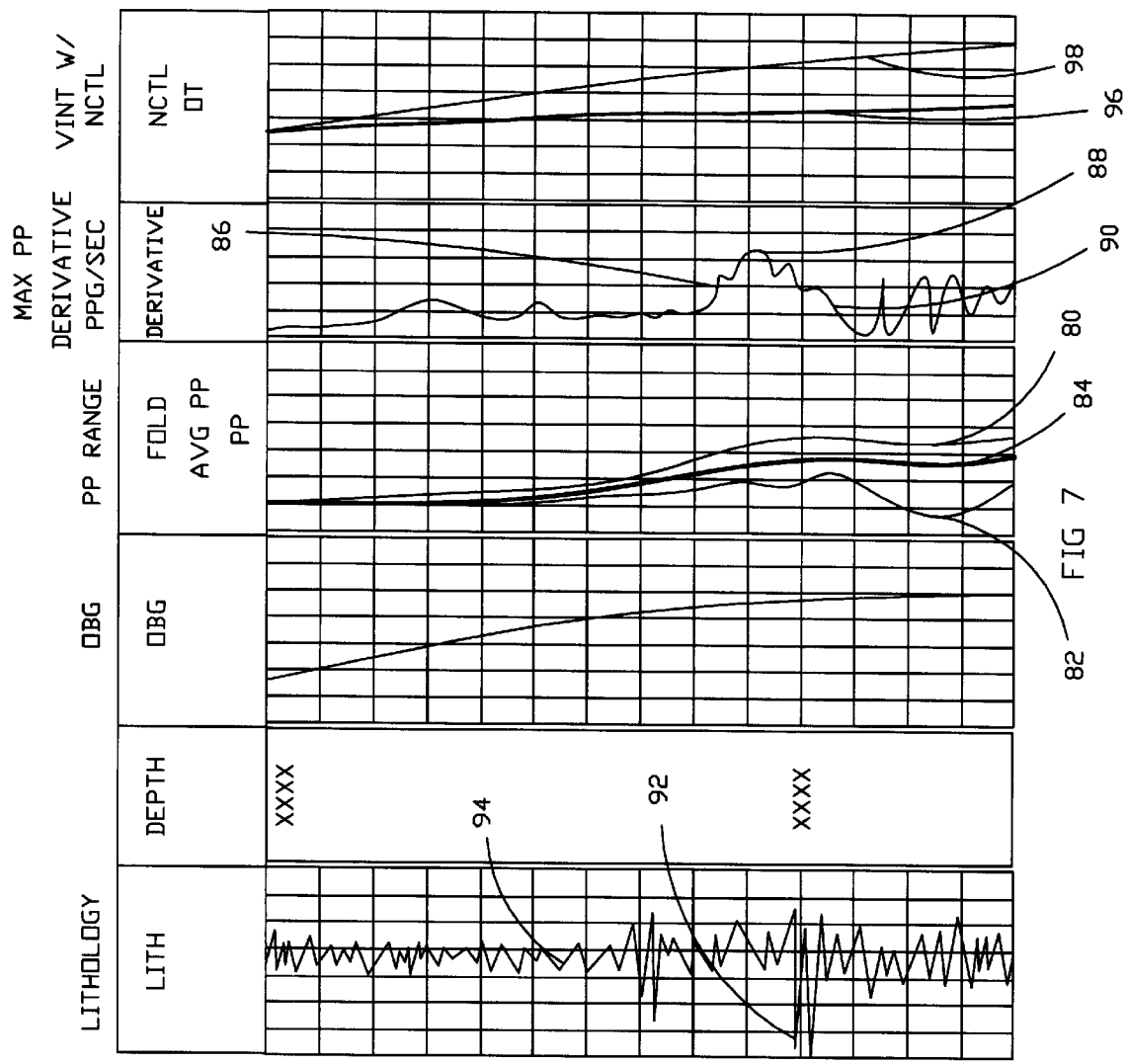

METHOD OF SEISMIC SIGNAL PROCESSING

BACKGROUND OF THE INVENTION

1. Field of the Invention

The present invention relates generally to seismic signal processing and, more particularly, to apparatus and methods for improved interpretation of seismic data to more accurately identify geopressures, seismic velocities, and/or other formation attributes.

2. Description of the Background

When planning the drilling of a well, the drilling engineer must make decisions about the mud program, the casing program, and the like. The consequences of such decisions are significant and impact the likelihood of success of the well, the cost of the well, the environment, and even the safety of the well personnel. For instance, if the mud selected or used at any particular depth is too light to hold the actual well pressure, or if other pressure control equipment utilized is inadequate, then blowouts, loss of life and property, environmental damage, and the like may occur. Costs of blowouts may also include environmental remedial costs, loss of production, and relief well costs. If a blowout occurs, well control specialists can be quite expensive, costing millions of dollars per well. On the other hand, if the mud selected is too heavy, then loss of circulation may occur with costly consequences such as kicks, underground blowouts, stuck pipe, and the need for side tracks. As well, damage to the formation may occur that may reduce or limit the well's productivity. Additional control equipment for handling pressure is costly and the over-engineering of a well can add significantly to the well costs. If the anticipated pressure does not materialize, then this money is wasted.

It is therefore desirable to keep drilling mud weights as light as possible to most economically penetrate the earth. It is also desirable to know what pressures are expected so that suitable but economically reasonable pressure control equipment is available on site. The required mud weight will typically vary with depth during the drilling of the well. For the reasons discussed above, mud weight is carefully monitored and may be increased during drilling operations to compensate for geopressure.

It is often desirable to set casing in a borehole immediately prior to encountering a pressured formation and then to increase mud weight for pressure control during further drilling. Setting a casing string which spans normal or low pressure formations permits the use of very heavy drilling muds without risking breaking down of borehole walls and subsequent lost mud. On the other hand, should substitution of heavy drilling mud be delayed until the drill bit has penetrated a permeable overpressurized formation (e.g., sandstone), it may be impossible to remove the drill string without producing a blowout or otherwise losing the well.

Geopressure conditions conducive to blowouts occur, in general, if fluids become trapped in rock and must support some of the overburden weight. As an example, there may be an earth formation of high porosity and high permeability, or a series of such formations, within a massive shale formation that is relatively impermeable. Fluid pressure of fluids trapped within such highly permeable formations (which usually are sands) may increase as the weight of overburden increases during sedimentation above the shale formation. When such formations are penetrated, the large pressure gradient into the borehole can easily result in a blowout.

To make the well program decisions, the drilling engineer typically relies on data from offset wells, assuming offset wells have been drilled. If there are no offset wells, then the decisions may be made in the light of significant geologic uncertainties. Even if there are offset wells, assumptions are made to the effect that the future well will be like the offset well. However, drilling rarely goes just like the offset in spite of the best correlation efforts. For instance, pore pressures, and the attendant possibility of blowouts and/or extra gas production, can vary significantly within even the same field and within close distances of offset wells. Gas pockets with high pressures may be encountered in one well that are not present in a closely adjacent well. For instance, in some fields that normally have low geopressures, gas pockets may exist but may be rare so that when encountered the rig crew may be unprepared.

Well logs are sometimes used to analyze offset wells to determine, for instance, pore pressures at the offset well in the hope that the well to be drilled in the future will have the same properties. As discussed above, due to differences from well to well, the results may not be sufficiently accurate or similar enough to avoid significant problems, set casing at the appropriate positions, and/or to efficiently produce the hydrocarbons. The analysis for pore pressures involves use of well logs such as gamma ray, velocity, and spontaneous potential well logs to select corresponding shale points in a sonic or resistivity well log. A normal compaction trend line is then determined and the departure of the sonic or resistivity data from the trend line is used to compute pore pressures.

From the drilling engineer's point of view, it would be very highly desirable to accurately predict pore pressures from seismic data. In this way, the data could be specific to each well rather than after the fact and typically a variation from the values predicted by offset wells. Therefore significant efforts and attempts have been made in the past by those skilled in the art to utilize seismic data for such purposes. Unfortunately, attempts to predict pore pressure from seismic data have been relatively poor. In the prior art, seismic velocities are determined from seismic data utilizing normal move out techniques. From the seismic velocities so determined, as discussed in the subsequently listed patents, the normal compaction trend lines have been determined and pore pressures computed. However, while general trends may be seen from such analysis, the seismic velocity determined by prior art seismic data analysis techniques does not have sufficient resolution accuracy to permit actions to be taken at optimal well depths to most efficiently drill and produce the well.

The following representative patents show attempts to utilize or improve upon the move out velocities derived from seismic data for determining pore pressure as per the prior art:

U.S. Pat. No. 3,898,610, issued Aug. 5, 1975, to E. S. Pennebaker, Jr. discloses methods of geopressure assessment in an area proposed for drilling: first, perform a seismic observation (using a common midpoint (CMP) method as illustrated in Pennebaker FIG. 1) to determine average seismic velocity as a function of depth by move out techniques. Next, compute interval transit time as a function of depth, and then compare these observed interval transit times to putatively normal interval transit times as illustrated in Pennebaker. Depths where observed interval transit times are greater than normal indicate lower-than-normal velocity and inferentially greater-than-normal porosity and thus geopressured fluids. Putatively normal interval transit times are either (I) directly measured in a borehole in the general area which encountered only normal pressures during drilling or (ii) computed by following an expression for seismic velocity V (feet/second) as a function of depth D, with D measured in feet from a location of known seismic velocity.

U.S. Pat. No. 6,374,186B1, issued Apr. 16, 2002, to Dvorkin et al., discloses a method for overpressure detection and pore pressure change monitoring in subsurface gas, liquid hydrocarbon, or water reservoirs from compressional- and shear-wave measurement data. As part of this method, one or more Poisson's ratios are determined from field-based measurement data and are then compared against known Poisson's ratio values representative of the particular subsurface formation type. By applying a Poisson's ratio—pore pressure criterion that is appropriate for that type of formation, an overpressure in the formation is identified.

U.S. Patent No. 5,343,440, issued Aug. 30, 1994, to Kan et al., discloses a method wherein seismic data is combined with well log data to generate a two-dimensional geopressure prediction display; this permits deviated and horizontal well planning plus lithology detection. Shale fraction analysis, compaction trend, and seismic velocity may be automatically or interactively generated on a computer work station with graphics displays to avoid anomalous results. Corrections to velocity predictions by check shots or VSP, and translation of trend curves for laterally offset areas increases accuracy of the geopressure predictions. Multiple well logs in a basin permits analysis fluid migrations.

U.S. Pat. No. 5,937,362, issued Aug. 10, 1999, to Lindsay et al., discloses a pore pressure prediction method that includes the steps of: (a) designing a normal compaction trend velocity model; (b) testing the normal compaction trend velocity model; (c) designing 3-D spatial adjustment parameters to compensate for water depth; and (d) processing a 3-D velocity field using the interpreted normal compaction trend velocity model and the 3-D spatial adjustment parameters.

The above discussed prior techniques are fraught with numerous potential errors due to the limitation of prior methods of utilizing seismic date to calculate velocities. Consequently, there remains a long felt need for improved methods of seismic signal analysis for more accurately predicting pore pressures It would also be desirable to more accurately determine velocities and/or other attributes from seismic data without the need to rely on move out techniques. Those skilled in the art have long sought and will appreciate the present invention which addresses these and other problems.

SUMMARY OF THE INVENTION

It is an object of the present invention to provide an improved seismic analysis method.

It is yet another object of the present invention to predict pore pressures, stress, fracture gradients, and formation compressive strengths from seismic data.

It is yet another object of the present invention to provide means for determining seismic velocities and other formation attributes which avoid the limitations of prior art techniques based on move out techniques.

An advantage of the present invention is more accurate and improved location and description of geopressures.

These and other objects, features, and advantages of the present invention will become apparent from the drawings, the descriptions given herein, and the appended claims. However, it will be understood that above-listed objectives and/or advantages of the invention are intended only as an aid in quickly understanding aspects of the invention, are not intended to limit the invention in any way, and therefore do not form a comprehensive or restrictive list of objectives, and/or features, and/or advantages.

In accord with the present invention, a method of analyzing seismic data is provided. In one possible embodiment thereof, the method is utilized to determine geopressures for an earth formation. The method may comprise one or more steps such as, for instance, obtaining seismic data related to the earth formation wherein the seismic data may comprise one or more seismic signals transmitted through the earth formation, and/or determining at least one frequency related attribute of the one or more seismic signals, and/or determining geopressures from the at least one frequency related attribute.

The frequency related attribute may be any frequency related attribute for one or more seismic signals such as, for example only, an average frequency, a frequency attenuation, an instantaneous frequency, a signal amplitude within a frequency band of the one or more seismic signals, a frequency related transform, a shape of a frequency response envelope, and/or other frequency related attributes or combinations, derivations, or permutations thereof.

The method may further comprise plotting geopressure with respect to time/depth within the earth formation. It is understood that time and depth are interchangeable for seismic data and seismic data may be displayed in either format and therefore may be referred to as time/depth herein. Other steps may comprise determining the geopressure by calibrating the frequency related attribute in terms related to geopressure and/or determining the geopressure as a function of the frequency related attribute.

In another embodiment, the method may comprise determining at least one of a velocity or a geopressure related attribute of the one or more seismic signals from the at least one frequency related attribute. In this embodiment, the frequency related attribute may be calibrated or utilized to derive the seismic velocity or the geopressure related attribute.

In another embodiment, a method for determining an overpressure may comprise one or more steps such as, for instance, determining a range of values for geopressure with respect to time/depth, determining a rate of change of a maximum of the range of values, and determining a time/depth wherein a transition in the rate of change occurs such that the rate of change stops increasing and decreases.

Other steps may comprise locating a formation at a time/depth below the transition having a lithology wherein fluid may flow. For instance, the formation could be a sand or limestone located below a large shale formation. In one presently preferred embodiment, the step of determining a rate of change comprises determining a derivative of the maximum of the range of values.

BRIEF DESCRIPTION OF THE DRAWINGS

FIG. 1A is a schematic of formation structure containing normal pressure wherein grains support the solid overburden;

FIG. 1B is a schematic of formation structure containing high pressure wherein grains support less of the solid overburden and fluid supports a significant part of the solid overburden;

FIG. 2A is a graph of amplitude vs frequency response for seismic signals which are representative of those transmitted through formations as described in FIG. 1A;

FIG. 2B is a graph of amplitude vs frequency response for seismic signals which are representative of those transmitted through formations as described in FIG. 1B;

FIG. 2C is a graph showing a plurality of seismic signal traces representative of those transmitted through earth formations;

FIG. 7 is a graph showing another embodiment of the invention for determining the likelihood of high pore pressures that may be encountered during the drilling of a wellbore in accord with the present invention.

Figure 3:
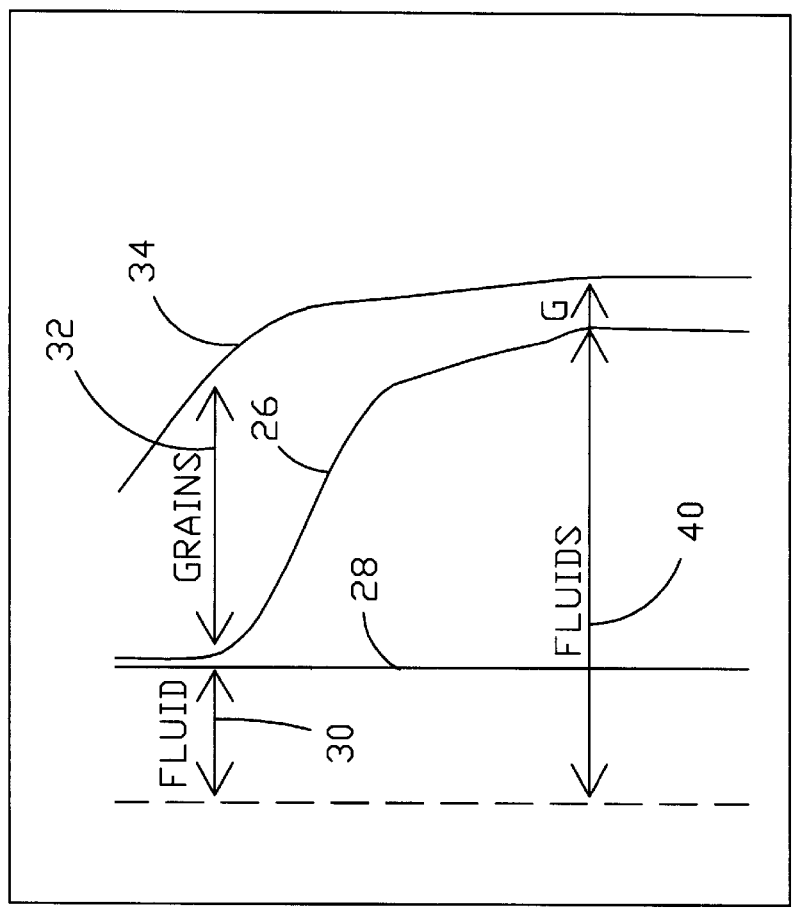
FIG. 3 is a graph showing changes in pore pressure with respect to depth wherein the formation structure changes from the type described in FIG. 1A to the type described in FIG. 1B.

While the present invention will be described in connection with presently preferred embodiments, it will be understood that it is not intended to limit the invention to those embodiments. On the contrary, it is intended to cover all alternatives, modifications, and equivalents included within the spirit of the invention and as defined in the appended claims.

DETAILED DESCRIPTION OF THE PREFERRED EMBODIMENTS

Referring now to the figures, and more particularly to FIG. 1A and FIG. 1B, there are shown basic grain and fluid elements for two underground earth formations with different pore pressure characteristics. In FIG. 1A, upper grains 10 and 12 and the weight above upper grains 10 and 12 are completely supported by lower grains 14 and 16. Lower grains 14 and 16 therefore support the entire weight of the earth or solid overburden directly above them as indicated by force lines 18 and 20. Fluid 22 in pore space 24 simply supports the fluid but not the earth or solids portion of the overburden. Thus, the fluid overburden is supported substantially entirely by fluid and the solid overburden, less the buoyant effect of the displaced fluid, is supported substantially entirely by solids in situation depicted in FIG. 1A. Graphically, the situation of FIG. 1 may be shown in the upper portion of FIG. 3 wherein pore pressure curve 26 is adjacent to the purely hydrostatic pressure indicated at fluid weight baseline 28 which is the weight of a fluid, such as water. Fluids are supported entirely by other fluids to produce the fluid pressure indicated at 30. Thus, when pore pressure 26 is approximately equal the fluid pressure indicated at 30, which comprises only fluid hydrostatic pressure 28, then the pore pressure simply supports hydrostatic weights of fluid but not the solid overburden. As indicated by grains force 32, grains support the earth portion of the overburden. The total fluid and solids overburden pressure is given by curve 34 which may be referred to as the overburden gradient.

In FIG. 1B, the situation has changed, so that lower grains 14 and 16 are no longer supporting the entire earth overburden above through upper grains 10 and 12, as may occur for many reasons some of which are discussed hereinbefore. The reduced forces supported by lower grains 14 and 16 are indicated by reduced force lines 36 and 38, which are much less than force lines 18 and 20. In this case, fluid 22 in pore space 24 now supports a significantly larger portion of the total overburden because the fluid now supports a portion of the solids overburden as well as the fluids overburden. Therefore, fluid 22 is under a higher pressure than one would anticipate simply by determining the hydrostatic weight of the fluid. The lower portion of FIG. 3 shows the situation of FIG. 1B graphically as can be seen wherein pore pressure curve 26 extends away from hydrostatic pressure curve 28 closer to total overburden gradient curve 34. Fluids now provide support force 40 which, in this example, comprises a force almost as large as the combined fluids and solids overburden gradient. Thus, the pore pressure in the situation of FIG. 1B is a high pressure of which advance knowledge would be highly desirable for a driller about to drill a wellbore through the formation of FIG. 1B.

In conjunction with the above discussion of FIG. 1A and FIG. 1B, corresponding FIG. 2A and FIG. 2B illustrate some basic concepts according to one embodiment of the present invention for predicting pore pressure or geopressures as well as other physical attributes, such as seismic velocity, as discussed hereinafter. Accordingly, it is submitted that in normal pressure regimes, such as that shown in FIG. 1A, the strong grain-to-grain contacts, whereby the grains support the entire solids overburden, the acoustic bandwidth available for transmission of the seismic signal through the strong grain-to-grain contact is relatively broad thereby more readily permitting easier passage of the signal without distortions, signal loss, and the like. In other words, the signal path provided by strong grain-to-grain contact of the solids is more likely to easily pass seismic signals.

In FIG. 2C, there are shown seismic signal traces 42 which are typical of seismic data. The seismic traces have a signal amplitude which varies with respect to time/depth. Each trace may typically be determined by a plurality of signal frequencies. The impulse, such as thumper or explosive used to generate sound waves typically includes a very wide band of frequencies. Mathematically, a perfect impulse includes all frequencies. Thus, the returned or received seismic traces of the seismic data can be analyzed according to their frequency content to determine what effect transmission through the formation had in attenuating and/or passing certain frequencies or ranges of frequencies.

The graph of FIG. 2A illustrates a typical frequency spectrum for formations of the type depicted in FIG. 1A. More generally, FIG. 2A is a plot of curve 44 which is an amplitude of the seismic signals with respect to a frequency range wherein the amplitude of signal content at each signal frequency is displayed. Because of the better grain-to-grain acoustic transmission characteristics of formations wherein the solids overburden is carried by solids, the frequency response characteristics of the formation of FIG. 1A are better than and/or different from those of FIG. 1B. Therefore, it will be noted that curve 44 contains frequency components 46 at higher frequencies and generally has an altered shape or envelope as compared to curve 48 of FIG. 2B.

As pressure builds up and the grain-to-grain contact decreases, the seismic energy is absorbed at a higher rate due to decreased acoustic transmission characteristics. This is especially true for higher frequencies as shown in FIG. 2B where the higher frequencies have been substantially attenuated. Thus, the frequency bandwidth available for transmission of seismic signals through the formation of FIG. 2B is, for the most part, decreased and generally produces greater attenuation of frequency components of the seismic signals 42, especially noticeable with respect to higher frequencies. Therefore seismic signals 42 which return from overpressure formations have altered frequency characteristics of the high frequency components and/or other altered frequency characteristics. As an example of other altered frequency characteristics, it will be seen that the envelope or shape of the curve 48 has changed significantly from that of curve 44.

In accord with the present invention, the pore pressure can be determined directly from the frequency characteristics of the seismic signals. The use of normal moveout techniques for determining seismic velocity and then pore pressure from the so-obtained seismic velocity as per the prior art for determining geopressures, with the attendant problems thereof discussed hereinbefore, may be avoided in accord with the present invention. Thus, the inaccuracies and lack of resolution of seismic signal velocity information determined by prior art methods are also avoided. In fact, the present invention also allows the acoustic velocity of the seismic signals to be determined from the frequency characteristics of the seismic signals or traces such as traces 42. Thus, the present invention also results in the velocity being determinable from frequency characteristics of the seismic signals, thereby providing a highly novel method for determining seismic signal velocity. Since much seismic interpretation is based on the seismic signal velocity, the present invention provides a new and more accurate means of seismic analysis in general based on an improved seismic signal velocity.

Figure 4:
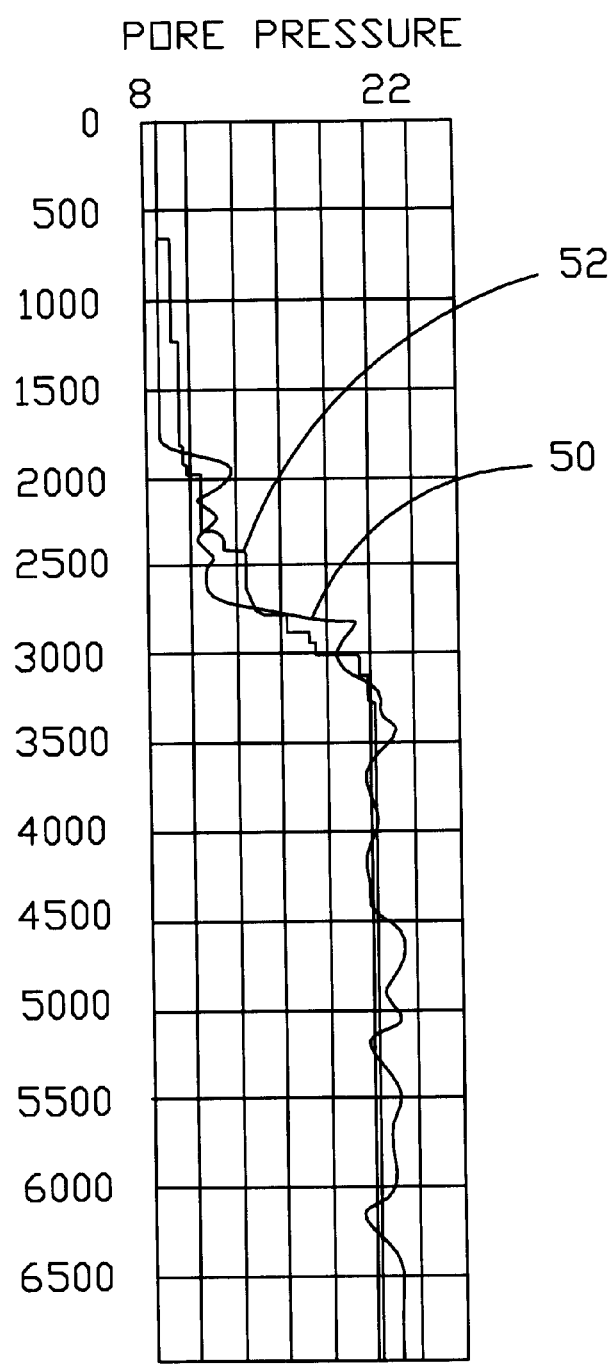
FIG. 4 is a graph of depth vs mud weight and pore pressure wherein the value for pore pressure is determined in accord with the present invention and compared to the mud weight actually utilized.

FIG. 4 illustrates the power and accuracy of the present invention for predicting pore pressures. In FIG. 4, curve 50 is a plot of pore pressure in terms of pounds per gallon required to offset pore pressure with respect to depth computed utilizing seismic data in accord with the above described concepts utilizing one or more frequency related attributes of the seismic signals. Curve 52 is a plot of the actual recorded mud weight in pounds per gallon utilized with respect to drilling depth. As can be seen in FIG. 4 from comparison of curve 50 and 52, the seismic data determined pore pressure is highly predictive, has excellent resolution, and is accurate.

Figure 5:
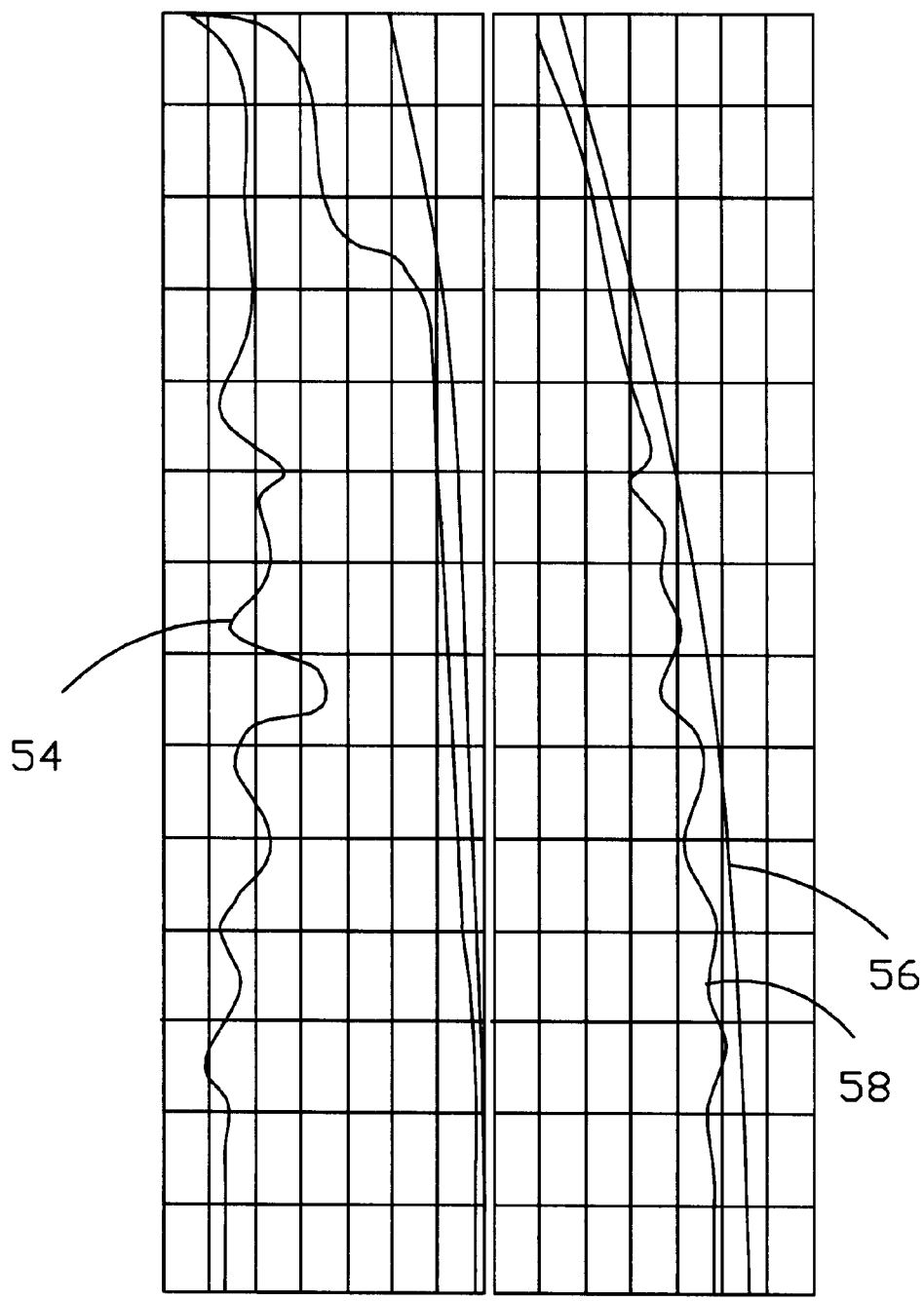
FIG. 5 is a graph of a sonic log versus normal compaction trend line showing a substantially inverse relationship with pore pressure whereby velocity may be determined in one possible embodiment from pore pressure derived in accord with the present invention.

FIG. 5 illustrates well log type analysis whereby one possible means is disclosed for determining seismic velocity, or velocity of sound through a formation, utilizing the frequency of the seismic signal as discussed hereinbefore. While different methods may be utilized, in this example, pore pressure curve 54 with respect to well depth may be determined in accord with the concepts of the present invention, the particular details of which are disclosed hereinafter. Once the pore pressure is determined, then the acoustic velocity can be determined from the pore pressure because velocity is inversely related to pore pressure. Utilizing the normal compaction trend line 56, and by simply projecting a sonic log 58 in reverse manner to that which would produce the pore pressure curve 54 from the velocity, according to prior art techniques, the velocity log is therefore reproducible without the need for relying on prior art moveout techniques to determine seismic velocities. In other words, the present invention may back-calculate from the already predicted pore pressure to produce the velocity curve, or speed of sound through a formation, which is of course also the speed of a seismic signal sound wave through the formation. It will be noted that this method is somewhat roundabout and is simply provided an example illustrating the principle that the velocity is determinable from the seismic signal frequency components. It will be therefore recognized that the present invention may also be utilized to determine other attributes related to the velocity, or derivable from the velocity in a manner which is not limited to moveout calculated velocities or the shortcomings thereof.

Figure 6:
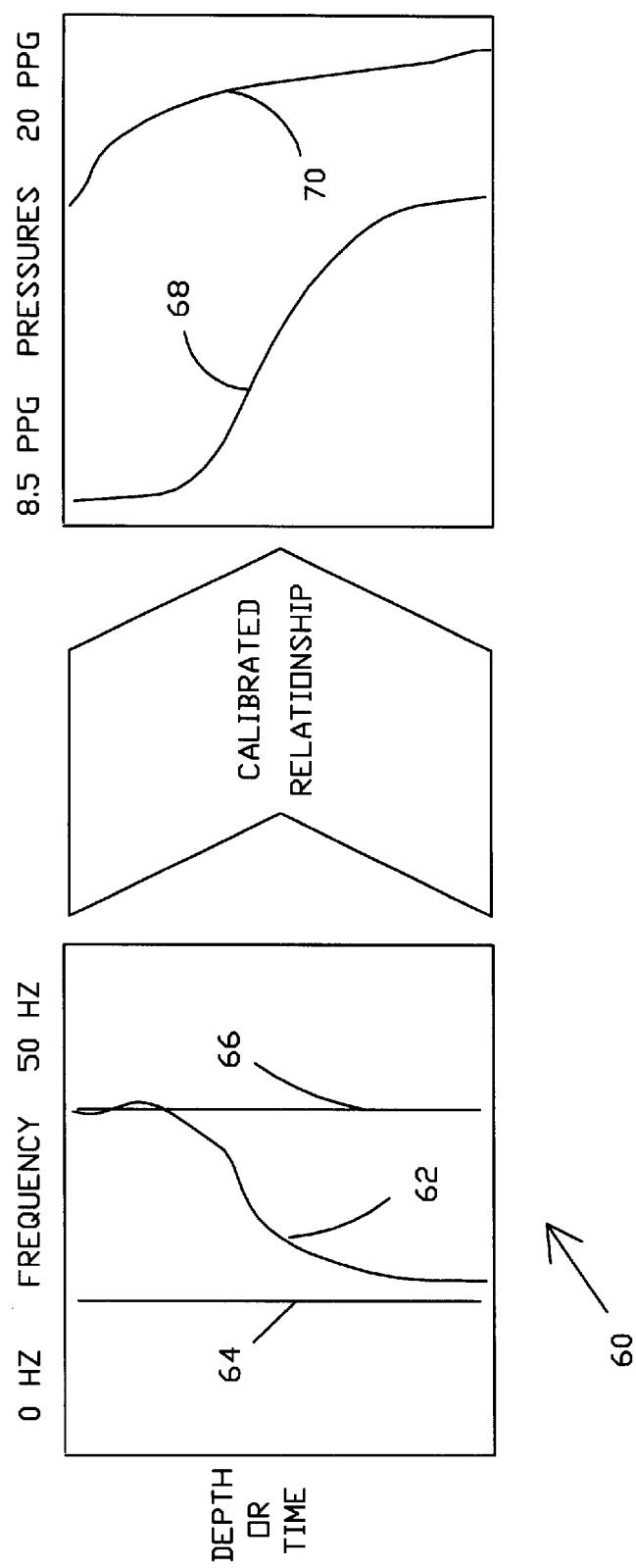
FIG. 6 discloses steps of another method in accord with the present invention that may be utilized for determining pore pressures and/or seismic velocities utilizing a frequency related attribute of the seismic data.

FIG. 6 discloses, as an example only, one method for determining quantitative values for pore pressure from frequency related characteristics of the seismic signals. It will be understood that velocity could also be calculated directly by this same technique. However, it will be understood that the invention is not intended to be limited to this particular method for calculating pore pressures or frequencies. In this example, the process of going from frequency or any frequency-related attribute to pore pressure (or velocity or other attributes) may be characterized largely as a calibration procedure. In this particular embodiment, an attribute related to frequency of the seismic signals, such as one or more seismic trace signals 42 is selected. Note that different traces may be utilized for such calculations at different depths, or traces may be combined, and the traces may be stacked or not. Thus, the present discussion is not intended or perhaps capable of listing every possible permutation of the basic concepts of the invention. As well, it will be understood that numerous different frequency attributes, or combinations thereof, could be plotted in accord with the invention.

The frequency response of seismic signals in two different types of formations as discussed above may be utilized as example of the signals to be analyzed. Analysis of the frequency response of the seismic signals in terms of frequency related features such as average frequencies, frequency bandwidths, frequency response envelope shapes, frequency attenuation or absorption or function thereof, frequency conductance, instantaneous frequencies or bandwidth, the power in a particular bandwidth of signals, integrals or mathematical transforms such as Hilbert or Fourier transforms of the seismic signals, may be utilized in accord with the present invention as the one or more frequency related attributes, or combinations thereof for making the calculations.

For example, the average frequency over the bandwidth of frequency response from seismic sections may be calculated from the frequency responses shown in FIG. 2A and FIG. 2B and used as the selected frequency related attribute. The selected attribute or attributes is then plotted as shown in 60. If desired, the frequency attribute plot results may be smoothed or averaged such as in spatial and/or temporal directions.

As one possible specific example, the smoothed frequency related attribute from a single seismic trace can be plotted versus time or depth as indicated by curve 62 where a frequency lower limit 64 and frequency upper limit 66 may indicate the boundaries of the plot, i.e., relatively higher and lower values are obtained. While it is convenient to utilize the maximum/minimum values, two calibration points of a high value and low value could be utilized in accord with this method. To these max/min boundaries or high/low points, suitable max/min or high/low pore pressure or seismic velocity values may be assigned so that the frequency related attribute is effectively recalibrated in terms of the desired output, such as pore pressure or velocity or another variable. Note that the seismic velocity values may be inverted with respect to the selected frequency attribute as compared to the pore pressure and therefore the maximum or higher value of seismic velocity may be assigned to the minimum or lower value of the frequency related attribute plot.

For pore pressure determinations, as discussed above, the decay in frequency will be related to pore pressure or effective stress. If the pore pressure for the field is known at the approximate depth ranges of interest, then those values may be utilized for calibration purposes for the maximum and minimums or highs and lows assigned to the frequency attribute maximum 66 and frequency related attribute minium 64. Values derived from prior art seismic pore pressure analysis methods, while not providing sufficient resolution to be useful during drilling, may still be useful to provide minimum and maximum calibration values. Thus, the present invention could be calibrated with pore pressures or velocities calculated solely by move out techniques in a manner that results in an improved pore pressure or velocity with greater resolution and accuracy. The plot 62 is then simply replotted in terms of the calibrated values. The intermediate values between the high and low values is interpolated The result may then be plotted to provide, for instance, pore pressure gradient curve 68 along with overburden gradient curve 70. While the pore pressure has been utilized for this example,- the same process applies to producing a graph of seismic velocities.

The pore pressure and velocity may also be determined as a mathematical function of the frequency related attribute. As one possible example, the following formula may be utilized for determining pore pressure. The same type of formula could also be utilized for determining velocity. However, this example is provided only for explanation and not to be considered at all limiting due to the numerous possible means for such calculations, would be the following:

$$PP = 8.6 + (OBG - 8.6) * \{(Frequency_{max} - Frequency)/(Frequency_{max} - Frequency_{min})\}^{exponent}$$

where:

PP is pore pressure gradient

OBG is overburden gradient

Frequency is the chose frequency related attribute $Frequency_{max}$ is the chosen upper frequency limit that may decay in time or depth $Frequency_{min}$ is the chosen lower frequency limit that may decay in time or depth exponent is an exponent that can be chosen to better fit the known pore pressures from available data Thus, the above shows one possible method for obtaining a quantitative pore pressure and pore pressure gradient curve from analysis of frequency related attributes of one or more seismic traces. The process can be applied to obtain significant properties such as seismic signal velocity, pore pressure, effective stress, and the like. However, it will be understood that numerous steps could be added, changed, or altered, and/or numerous frequency related attributes could be utilized to perform the method.

Having established a relationship between frequency and pore pressure and/or effective stress, a transformation from pore pressure to velocity becomes obvious. Prior art shows numerous ways in which pore pressure can be calculated from velocities. Applying any of these methods in reverse allows a simple way to go from pore pressure to velocity and, therefore, from frequency to velocity.

A more direct way of arriving at velocity may be obtained by calibrating some form of frequency to a known velocity profile such as one calculated from well logs. One such embodiment of this is achieved by taking the first derivative of the average frequency with time and comparing/calibrating the resulting curve to the calibration velocity profile. This is done by finding an appropriate factor to multiply and shift the first time derivative of frequency such that the result closely resembles the velocity control. The needed multipliers and shift values are empirically derived and may vary as a function of seismic two way time.

The uses of a velocity thus calculated can be many and varied and include but are not limited to: depth conversion of seismic time sections to depth sections; and, constraints or initial guess information for seismic normal moveout correction as well as seismic migration. Another application of obtaining velocity information is that it can be used together with frequency to obtain wavelength. The well known formula Velocity=Frequency *Wavelength can be used to achieve this goal. Wavelength information has widespread applications such as, but not limited to, error estimation of target's depth or thickness, and onset of excess pore pressure. Given that velocity and frequency are both related to pore pressure it is likely that wavelength is related to pore pressure.

FIG. 7 provides yet another embodiment of the present invention for determining overpressure points in the well at which may be encountered. In this method, a pore pressure range of values is established whereby a maximum and minimum pore pressure may be plotted as indicated. In this example, maximum pore pressure curve is indicated at 80, minimum pore pressure curve is indicated at 82 and the determined pore pressure curve is indicated at 84. Curves 80 and 82, the minimum and maximum pore pressure curves, are determined by investigating all of the computed pressures within a given radius of the proposed well-bore and capturing the extreme values at each depth point. In one embodiment the radius of investigation along the well path would form a cylinder. However, a varying radius of investigation could be utilized. For instance, in FIG. 7, the radius of investigation increases with depth to produce a cone shape with the small end at the surface and increasing in radius with depth/time. This effect is advantageous because the errors in the seismic data as well as the actual location of the well increase with time/depth. The size of the cone, hour glass, or other selected shape produced by varying the radius is a matter of judgement, however, as a guide the radius of the fresnel zone would likely be appropriate.

The result of this process produces a cone of pore pressure values around the pore pressure curve 84 for the anticipated wellbore that increases with depth. In a presently preferred embodiment, a change in the maximum pore pressure is closely monitored for variations in rates of change. One preferred method involves monitoring the derivative of the maximum pore pressure as indicated by derivative curve 86, which provides an instantaneous rate of change of the maximum pore pressure whose units are then ppg/sec. While use of the maximum pore pressure curve is presently preferred, the derivative of other pore pressure values may be utilized. In essence, the technique requires scanning the derivative curve to detect a transition zone wherein a build up occurs followed by a drop in the rate of change of the maximum pore pressure as indicated at the transition zone of peak 88 and decline 90. This pattern indicates that pore pressure is building and will become evident upon entering a zone where fluid is free to move such as the subsequent sand 92 as indicated on lithology log 94. A view of prior art techniques such as prior art seismic velocity 96 with respect to normal compaction trend line 98 provides no indication of the impending point where high pressure is anticipated. Prior art seismic velocity tends to have inadequate resolution to provide sufficient warning of overpressures. This technique may, if desired, be utilized in conjunction with other techniques related to pore pressure as discussed hereinbefore.

Thus, the present invention provides methods for detecting overpressured regions and geopressures. The present invention also provides improved techniques for determining seismic velocity signals without relying on prior art move out techniques.

The foregoing disclosure and description of the invention is illustrative and explanatory thereof, and it will appreciated by those skilled in the art, that various changes in the ordering of steps, ranges, and/or attributes and parameter, as well as in the details of the illustrations or combinations of features of the method of seismic analysis may be made without departing from the spirit of the invention.

What is claimed is:

1. A method of determining geopressure for an earth formation from seismic data related to said earth formation, said seismic data comprising one or more seismic signals transmitted through said earth formation, comprising:

creating acoustic vibrations within the Earth as a result of utilizing an acoustic energy source, said acoustic vibrations traveling into the Earth;

measuring said acoustic vibrations with one or more acoustic sensors to create a seismic survey comprising said one or more seismic signals;

determining at least one frequency related attribute of frequencies contained within said one or more seismic signals; and determining geopressures in said earth formation from said at least one frequency related attribute without requiring use of seismic velocities or acoustic velocities for said earth formation.

2. The method of claim 1, further comprising plotting geopressure with respect to time/depth within said earn formation.

3. The method of claim 1, wherein said at least one frequency related attribute is an average frequency of said one or more seismic signals.

4. The method of claim 1, wherein said at least one frequency related attribute at least one of a group of frequency related attributes consisting of a frequency attenuation of said one or more seismic signals, an instantaneous frequency of said one or more seismic signals, a signal amplitude within frequency band of said one or more seismic signals, a frequency related transform, a shape of a frequency response envelope of said one or more seismic signals.

5. The method of claim 1, further comprising deriving a velocity of one or more seismic signals from said at least one frequency related attribute.

6. The method of claim 1, further comprising determining said geopressure by calibrating said frequency related attribute in terms related to geopressure.

7. The method of claim 6, further comprising determining a relatively high value as compared to a low value of said frequency related attribute, determining a relatively high value as compared to a low value of said geopressures, and utilizing said relatively high value as compared to a low value of said geopressures to recalibrated said frequency related attribute in terms of geopressures.

8. The method of claim 7, further comprising plotting geopressures utilizing said recalibrated frequency related attribute.

9. The method of claim 1, further comprising determining said geopressure as a function of said frequency related attribute.

10. The method of claim 9, wherein said geopressure is an equation substantially as follows:

$$PP=8.6+(OBG-8.6)*\{(\text{Frequency}_{max}-\text{Frequency})/(\text{Frequency}_{max}-\text{Frequency}_{min})^{exponent}$$

where:

PP is pore pressure gradient

OBG is overburden gradient

Frequency is the chosen frequency related attribute $\text{Frequency}_{max}$ is the chosen upper frequency limit that may decay in time or depth $\text{Frequency}_{min}$ is the chosen lower frequency limit that may decay in time or depth exponent is an exponent that can be chosen to better fit the known pore pressures from available data.

11. A method of determining geopressure for an earth formation from seismic data related to said earth formation, said seismic data comprising one or more seismic signals transmitted through said earth formation, comprising:

creating acoustic vibrations within the Earth as a result of utilizing an acoustic energy source, said acoustic vibrations traveling into the Earth;

measuring said acoustic vibrations with one or more acoustic sensors to create a seismic survey comprising said one or more seismic signals;

determining at least one frequency related attribute of frequencies contained within said one or more seismic signals; and deriving at least one of a velocity to produce a derived velocity or a wavelength to produce a derived wavelength of one or more seismic signals from said at least one frequency related attribute.

12. The method of claim 11, further comprising determining geopressures from one or more of said at least one frequency related attribute, or said derived velocity, or said derived wavelength.

* * * * *

UNITED STATES PATENT AND TRADEMARK OFFICE
CERTIFICATE OF CORRECTION

PATENT NO. : 6,681,185 B1
DATED : January 20, 2004
INVENTOR(S) : Young et al.

It is certified that error appears in the above-identified patent and that said Letters Patent is hereby corrected as shown below:

Column 9,
Line 21, delete "-" after "example,".

Column 11,
Line 33, delete "earn" and replace with -- earth --.

Column 12,
Line 4, delete "recalibrated" and replace with -- recalibrate --.

Signed and Sealed this

Sixth Day of April, 2004

JON W. DUDAS
*Acting Director of the United States Patent and Trademark Office*